United States Patent [19]

Zegers et al.

[11] 3,904,400

[45] Sept. 9, 1975

[54] SEGREGATION ROAST PROCESS FOR THE RECOVERY OF NICKEL FROM LATERITIC ORE

[75] Inventors: Theodoor W. Zegers; William M. Goldberger, both of Columbus, Ohio; Tage L. B. Jepsen, Gabbs, Nev.; Harley C. Lee, Shaker Heights; Edward P. Pearson, Cleveland, both of Ohio

[73] Assignee: Basic Incorporated, Cleveland, Ohio

[22] Filed: June 18, 1973

[21] Appl. No.: 370,691

Related U.S. Application Data

[63] Continuation of Ser. No. 119,411, Feb. 26, 1971, abandoned.

[52] U.S. Cl. ................................................. 75/82
[51] Int. Cl.² .......................................... C22B 23/02
[58] Field of Search............................ 75/82, 21, 91

[56] References Cited
UNITED STATES PATENTS

| | | | |
|---|---|---|---|
| 3,148,974 | 9/1964 | Rampacek | 75/21 |
| 3,453,101 | 7/1969 | Takahashi et al. | 75/82 |
| 3,503,735 | 3/1970 | Beggs et al. | 75/82 |
| 3,656,935 | 4/1972 | Iwasaki | 75/82 |
| 3,754,896 | 8/1973 | Iwasaki | 75/82 |
| 3,761,245 | 9/1973 | Bingham | 75/21 |

*Primary Examiner*—C. Lovell
*Assistant Examiner*—M. J. Andrews
*Attorney, Agent, or Firm*—Wm. Griffith Edwards

[57] ABSTRACT

Lateritic ore is mixed with a chloridizing agent and a carbonaceous reductant to form an ore mixture for segregation roasting. The ore mixture is roasted at a temperature in the range of 1600°–2000°F. for a time duration of 0.5 to 2 hours in the presence of a reducing atmosphere provided by a mixture of $CO$-$CO_2$ or $H_2$-$H_2O$ gases to form a calcine containing nickel alloyed with iron. The calcine is subjected to a suitable treatment to recover the nickel therefrom.

5 Claims, No Drawings

SEGREGATION ROAST PROCESS FOR THE RECOVERY OF NICKEL FROM LATERITIC ORE

This is a continuation of Application Ser. No. 119,411 filed Feb. 26, 1971 now abandoned.

The present invention relates to the recovery of nickel from ore and more particularly to an improved process for recovering nickel conċentrate from lateritic ores.

One method previously devised for recovering nickel from lateritic ores is a segregation roast process. Basically, the segration roast process as heretofore developed for nickel recovery has consisted of mixing the ore to be roasted with a chloridizing agent and carbonaceous reductant, roasting this ore mixture in a furnace maintained at a predetermined temperature for a predetermined period of time, and subjecting the resulting sinter or calcine to a nickel concentration treatment to recover a nickel concentrate. While the mechanism of the segregation process is not completely understood, it is believed that the nickel in the ore is volatilized in this process as a chloride and deposited in situ as a metallic alloy on the surface of the carbonaceous reductant. By segregation in this manner, the nickel is amenable for separation from gangue constituents by physical methods, such as magnetic separation or flotation. Unfortunately, the segregation roast process as heretofore developed has had a very limited commercial success and has been found in many instances to not be commercially feasible.

Consequently, a series of investigations, some of which are hereinafter described, were conducted for the purpose of making the segregation process commercially feasible by improving its efficiency and consistency of performance and by finding ways to make operation of the process less expensive. The effects of varying different process variables in the segregation roast process were analyzed in these investigations. Among the process variables considered were the following: the use of various chloridizing agents; the amounts of chloridizing agent and carbonaceous reductant used; the form in which the ore mixture was roasted, i.e., pelletized or powdered form; the roasting temperature and duration of the roast; and the effect of the gas composition over the ore being roasted and its velocity.

In these investigations it was found among other things that variations in certain ones of the process variables had a substantial effect on the ultimate recovery of nickel by the segregation roast process. One variable found to significantly affect the segregation roast process was the chloridizing agent used. U.S. Pat. application Ser. No. 96,951, filed 10 December 1970, now U.S. Pat. No. 3,725,039 which is assigned to the assignee of the present invention covers this aspect of the segregation roast process and discloses a novel chloridizing agent suitable for use in the segregation process which is relatively inexpensive. Another variable found to significantly affect the recovery of nickel by the segregation roast process was the gas composition present over the ore during its roasting. In particular, it was found that high gas velocities or rates of flow of an inert gas atmosphere heretofore frequently present in the furnaces during the roasting step had a pronounced detrimental effect on the recovery of nickel from the roasted ore.

It is, accordingly, an object of the present invention to provide an improved segregation roast process for recovering nickel from lateritic ores in which the composition of the gas atmosphere present over the ore during segregation roasting is controlled so as to substantially eliminate the detrimental effects of gas velocity and changes in gas composition on the recovery of nickel from the roasted ore.

It is, also, an object of the present invention to provide an improved segregation roast process for recovering nickel from lateritic ores in which the composition of the gas atmosphere over the ore during segregation roasting is controlled so as to be reducing as a means of overcoming the adverse effects of high gas flow rates on nickel recovery.

It is, further, an object of the present invention to provide an improved segregation roast process for recovering nickel from lateritic ores in which a reducing atmosphere is maintained over the ore during segregation roasting.

It is, additionally, an object of the present invention to provide an improved segregation roast process for recovering nickel from lateritic ores in which a reducing atmosphere of a suitable ratio of $CO/CO_2$ or $H_2/H_2O$ is maintained over the ore during segregation roasting.

In accomplishing these and other objects, there has been provided in accordance with the present invention an improved segregation roast process for recovering nickel from lateritic ores, such as the laterite ores of Guatemala, Brazil, Cuba and New Caledonia. Among the types of lateritic ores suitable for treatment by this improved process are ores, such as nickeliferous laterites having a high percentage of iron, saprolites, decomposed ultra-basic rocks and their serpentized derivatives, and the so-called garnierites or nickel enriched serpentines.

The present improved process was developed as a result of a series of tests conducted on a sample of Guatemalan laterite weighing approximately 350 pounds and containing approximately 33 percent moisture on a dry basis. The ore was dried in stainless steel pans at 105°C and subsequently crushed and ground to minus 12 mesh. The dried sample was then riffled to a 1/32 cut and further ground to minus 65 mesh. During this crushing, grinding and screening, the dried ore readsorbed several percent of moisture and for ease of handling, the ore was used in this form, i.e., substantially in equilibrium with the moisture content of the surrounding air. Table A lists the chemical analysis of the Guatemalan laterite ore sample as used and on a dry basis.

TABLE A

| CHEMICAL ANALYSIS OF GUATEMALAN LATERITE | | |
|---|---|---|
| COMPONENT | %, AS USED | %, DRY BASIS |
| $H_2O$ | 6.52 | 6.98 |
| LOI | 9.65 | 10.3 |
| Ni | 1.46 | 1.56 |
| Co | 0.042 | 0.045 |
| $Fe_2O_3$ | 24.2 | 25.9 |
| $SiO_2$ | 36.9 | 39.5 |
| MgO | 15.3 | 16.4 |
| $Al_2O_3$ | N.A. | N.A. |
| CaO | N.A. | N.A. |
| $Cr_2O_3$ | N.A. | N.A. |

Note 1: LOI indicates loss on ignition at 1000°C.
Note 2: N.A. indicates that the component was present in the ore but the percentage of it therein was not analyzed.

In the segregation roasting experiments conducted, regular foundry coke ground to minus 48 mesh was used. Analysis of the coke gave the following results: volatile matter 1.40 percent, fixed carbon 75.10 percent and ash 23.50 percent. All other chemicals used in the roasting experiments were of the reagent grade.

As before mentioned, the segregation roasting process had heretofore frequently been conducted in the presence of an inert gas, generally nitrogen. To determine the effect of the rate of flow of the inert gas, i.e., nitrogen, over an ore sample during roasting, experiments were conducted using laterite ore in pelletized and loose powdered forms mixed with 10 percent coke and 10 percent calcium chloride under controlled nitrogen flow rates. The coke provided the carbonaceous reductant and the calcium chloride the chloridizing agent. The results of these experiments are shown in Tables B and C. The abbreviations mags and nonmags used therein mean, respectively, magnetic and nonmagnetic concentrates. Further, the percentages referred to in these tables, as well as elsewhere throughout the specification, refer to percentage by weight.

tained indicates that at 1700°F an increase in the nitrogen ($N_2$) or inert gas flow rate results in higher overall nickel recovery by lower grade nickel concentrates. At 1800°F, however, the effect of the nitrogen flow rate was reversed, an increase in the nitrogen flow rate resulting in higher grade concentrates at the expense of lower overall nickel recoveries. Thus, from the data of Table B it is clear that variations in the rate of flow of an inert gas over the powdered ore mixture being roasted do have significant and substantial effects on the grade of nickel concentrate obtained and the overall percent of nickel recovered in the segregation roast process.

Referring to Table C, the data there listed which was obtained by the segregation roasting of ore in a pelletized form affirms that variations in the flow rate of inert gas over an ore mixture during segregation roasting do have significant and substantial effects on the grade of nickel concentrate obtained and the percent of nickel recovered. Further, comparison of the data in Tables B

TABLE B

SEGREGATION ROASTING OF ORE IN LOOSE POWDERED FORM

| TEMP. °F | $N_2$ FLOW cc/MIN. | MAGS % of CALCINE | ANALYSIS, % Ni | | | Ni RECOVERY % |
|---|---|---|---|---|---|---|
| | | | CALCINE | MAGS. | NONMAGS | |
| 1700 | 5 | 1.80 | 1.49 | 30.1 | 0.89 | 41.5 |
| 1700 | 5 | 2.13 | 1.52 | 24.8 | 0.96 | 37.8 |
| 1700 | 100 | 5.06 | 1.53 | 13.1 | 0.78 | 52.2 |
| 1700 | 100 | 4.97 | 1.54 | 16.1 | 0.74 | 54.4 |
| 1800 | 5 | 21.4 | 1.59 | 5.90 | 0.42 | 79.2 |
| 1800 | 5 | 20.3 | 1.57 | 6.17 | 0.44 | 77.6 |
| 1800 | 30 | 12.6 | 1.60 | 9.20 | 0.46 | 74.9 |
| 1800 | 100 | 6.32 | 1.57 | 16.9 | 0.57 | 65.9 |
| 1800 | 100 | 6.64 | 1.62 | 14.9 | 0.62 | 64.4 |
| 1800 | 100 | 5.35 | 1.58 | 17.1 | 0.65 | 61.2 |

Note: Powders consisting of ore premixed with 10% coke and 10% calcium chloride were roasted at the indicated temperatures for one hour.

TABLE C

SEGREGATION ROASTING OF ORE IN PELLETIZED FORM

| TEMP. °F. | $N_2$ FLOW cc/MIN. | MAGS % of CALCINE | ANALYSIS, % Ni | | | Ni Recovery % |
|---|---|---|---|---|---|---|
| | | | CALCINE | MAGS. | NONMAGS | |
| 1700 | 5 | 1.90 | 1.56 | 40.8 | 0.67 | 58.1 |
| 1700 | 100 | 2.06 | 1.55 | 34.9 | 0.78 | 50.8 |
| 1800 | 5 | 16.7 | 1.59 | 6.24 | 0.59 | 67.4 |
| 1800 | 5 | 21.2 | 1.60 | 6.50 | 0.23 | 88.8 |
| 1800 | 100 | 2.53 | 1.55 | 31.0 | 0.75 | 52.9 |
| 1800 | 100 | 2.61 | 1.58 | 31.6 | 0.63 | 61.4 |

Note: ⅜" diameter pellets consisting of ore premixed with 10% coke and 10% calcium chloride were roasted at the indicated temperatures for one hour.

TABLE D

SEGREGATION ROASTING OF ORE PELLETS WITH REDUCED AMOUNT OF COKE

| TEMP. °F. | $N_2$ FLOW cc/MIN | TIME HRS. | MAGS % OF CALCINE | ANALYSIS, % Ni | | | Ni RECOVERY % | $CO/CO_2$ RATIO |
|---|---|---|---|---|---|---|---|---|
| | | | | CALCINE | MAGS | NONMAGS | | |
| 1800 | 5 | 1 | 2.58 | 1.65 | 34.45 | 0.77 | 54.5 | 0.34–2.24 |
| 1800 | 100 | 1 | 0.94 | 1.63 | 61.5 | 1.01 | 38.7 | 0.82–1.46 |
| 1800 | 100 | 2 | 0.83 | 1.63 | 69.0 | 1.01 | 38.6 | 0.41–1.54 |
| 1800 | 1000 | 1 | 2.65 | 1.62 | 9.82 | 1.38 | 17.2 | Approx. 0.27 |

Note 1: ⅜" diameter pellets consisting of ore premixed with 4% coke and 10% calcium chloride were roasted at the indicated temperatures for the indicated periods of time.

Note 2: The $CO/CO_2$ ratios, where expressed as a range, indicate the range of ratios from the time the indicated reaction temperature was reached to end of the segregation roast run.

Referring to Table B, which experiments were conducted prior to those of Table C, the data there obtained and C shows that, under otherwise identical roasting conditions, higher grade concentrates and slightly lower recoveries were obtained from pellets than loose powders. Additionally, it is noted that at 1800°F the effect of high nitrogen flow rates was as much or more pronounced on pellets than loose powders. The effect of high nitrogen flow rates at 1700°F, however, was less pronounced on pellets than on loose powders.

To obtain further information on the effect of nitrogen or inert gas flow rates, a series of experiments were conducted the data from which is shown in Table D. In these experiments, exhaust gases were analyzed by gas chromatography and the amount of coke in the charge or feed roasted was reduced to 4 percent of the weight of ore in an attempt to obtain concentrates of higher nickel concentrate.

Referring to Table D, it is evident therefrom that the flow rate of the inert gas over the roasting ore had a substantial effect on the ratio of CO and $CO_2$ in the gas atmosphere present over the roasting ore. Further, the data in Table D clearly shows that the higher the nitrogen flow rate the lower the observed $CO/CO_2$ ratio. Additionally, a high $CO/CO_2$ ratio was consistently associated with more complete reduction of the ore, as indicated by the nickel content of the magnetic concentrate, and with a relatively high nickel recovery. For example, in the experiments of Table D, the magnetic concentrates in the calcines were primarily iron-nickel alloys in the experiments where the nitrogen flow rates were 5, 100 and 100 cc/min with the nickel recovery being 54.5, 38.7 and 38.6 percent, respectively. In the experiment where the nitrogen flow rate was 1000 cc/min, however, the magnetic concentrate while being a relatively high percentage of the calcine, 2.65 percent, was predominantly magnetite and an extremely low nickel recovery was obtained, 17.2 percent. This low nickel recovery along with a high percentage of magnetic product in the calcine is consistent with incomplete reduction of the ore and supports the idea that high nitrogen flow rates cause low $CO/CO_2$ ratios which in turn cause incomplete reduction of the ore and consequent low nickel recovery.

Although the above-discussed experiments demonstrate a relation between the low $CO/CO_2$ ratios resulting with high nitrogen flow rates and low nickel recoveries, it was felt that these low nickel recoveries could also have been caused by higher volatilization losses at higher nitrogen flow rates of the chloride reagent mixed in the ore. Consequently, to evaluate this possibility, a number of experiments were performed with pellets containing 4 percent coke and 6 percent calcium chloride in which different flow rates of nitrogen were used and in which the inert gas nitrogen was replaced by a reducing atmosphere made up of a mixture of CO and $CO_2$. The results of these experiments are shown in Table E.

the ratio of one to one, is comparable to the $CO/CO_2$ ratios shown in Table D where a relatively low nitrogen flow rate was employed. Further, the results obtained by the experiments tabulated in Table E indicate that as good or better nickel recoveries are obtained using a high flow rate of a $CO$-$CO_2$ mixture than with a nitrogen flow rate of 5 cc/min. Thus, the data in Table E shows that increased losses of chloride gas as a result of high gas flow rates over the roasting ore has no effect on nickel recovery. Therefore, the above discussed experiments tabulated in Tables B–E clearly demonstrate that the pronounced deleterious effect of high flow rates of inert gas over the roasting ore is due to a decrease in the reducing capacity of the atmosphere surrounding the ore charge during segregation roasting.

It is noted that better nickel recoveries were obtained in some of the other discussed experiments than those using a $CO$-$CO_2$ gas flow and tabulated in Table E. The difference, however, is due to the fact that the other experiments were conducted with an ore mixture containing 10 percent calcium chloride while the experiments tabulated in Table E were conducted with an ore mixture containing only 6 percent calcium chloride. The data in Table E, however, clearly illustrates that by controlling the composition of the furnace atmosphere during segregation roasting so that it is maintained sufficiently reducing, e.g., a $CO/CO_2$ ratio of about 1.0 or an equivalent $H_2/H_2O$ ratio, that the deleterious effect of gas flow rates over the roasting ores may be eliminated. Therefore, nickel recoveries consistently as high or higher than those tabulated in prior experiments could be achieved by using 10 percent calcium chloride while maintaining the furnace atmosphere sufficiently reducing. Additionally, a mixture of sodium chloride and calcium oxide could be used as the chloridizing agent in place of calcium chloride with equal results, as is disclosed in assignee's aforementioned U.S. Pat. application, Ser. No. 96,951 now U.S. Pat. No. 3,725,039.

In practice, the exemplary segregation roast process herein discussed for recovering nickel from laterite ores is suitable for use on any ore having an iron content between 10–55 percent, but preferably the ore processed should have an iron content between 0 and 30 percent. The nickel content of the ore processed should preferably be at least 1% although the use of the segregation roast process is feasible on ore having a nickel content of 0.4 percent or greater. The moisture content of the ore to be processed is not critical as long as the material can be conveniently handled. A suitable range for the ore's moisture content would be about 0 and 30 percent. Drying of the ore prior to crushing may be desirable from a materials handling standpoint.

TABLE E

EFFECT OF GAS COMPOSITION AND FLOW RATE ON THE
SEGREGATION ROASTING OF PELLETS AT 1800°F

| GAS | GAS FLOW RATE, cc/MIN. | RETENTION TIME, HRS. | CALCINE % Ni | MAGNETICS % Calcine | % Ni | NONMAGS % Ni | Ni RECOVERY % |
|---|---|---|---|---|---|---|---|
| $N_2$ | 5 | 1 | 1.62 | 0.5 | 47.1 | 1.34 | 17.8 |
| $N_2$ | 100 | 1 | 1.63 | 0.06 | (Note 2) | 1.61 | 1.2 |
| $N_2$ | 1000 | 1 | 1.64 | 0.2 | 6.12 | 1.63 | 0.8 |
| $CO$-$CO_2$ | 500–500 | 1 | 1.64 | 1.2 | 35.4 | 1.21 | 26.8 |
| $CO$-$CO_2$ | 500–500 | 2 | 1.66 | 0.7 | 40.6 | 1.35 | 18.0 |

Note 1: The pellets consisted of ore mixed with 4% coke and 6% calcium chloride by weight of the ore. The calcines obtained were ground to 100 mesh and the nickel concentrates were recovered by magnetic separation.
Note 2: The magnetic concentrate obtained was an insufficient sample for purposes of analysis.

Referring to Table E, the ration of $CO/CO_2$ in the gas used in the last two experiments tabulated therein, i.e., For segregation roasting, minus 48 mesh ore material has been used as feed and use of coarser material is feasible as long as the charge or feed can be mixed adequately with the chloridizing agent and carbonaceous reductant. Crushing of the ore to minus 10 mesh should be sufficient. For the carbonaceous reductant, in addition to the foundry coke herein described, various other carbonaceous reductants, such as petroleum coke, anthracite and charcoal, would be suitable. The percent of carbonaceous reductant added to the ore may be anywhere within the range of 2 to 10 percent with the range preferred for Guatemalan laterite ore being 4 to 8 percent. The chloridizing agent used may be NaCl, KCl, $NH_4Cl$, $CaCl_2$, $MgCl_2$ or a mixture of NaCl and CaO. The preferred additive is $CaCl_2$ in a range of 6 to 10 percent or an equivalent mixture of NaCl-CaO.

For material handling, it is desirable to pelletize the charge of ore, chloridizing agent and carbonaceous reductant. Further, it has been found that the use of pellets instead of loose powder charges has resulted in substantially the same grade of ferronickel product for the same quantity of reagents used. The pellets used preferably should not be compressed to any degree. Hand rolled pellets or those rolled by a pelletizing disc or drum are suitable. The mixture of ore, chloridizing agent and carbonaceous reductant readily pelletizes with 15-25 percent moisture and the pellets may be then oven dried to 5–10 percent moisture, which moisture content gives sufficient green strength for handling.

In the roasting step, an effective temperature range for the roast is from 1600–2000°F and the preferred temperature range for roasting the ore mixture is 1700°-1900°F. The duration the ore is roasted at these temperatures may be between 0.5 to 2 hours and a time duration of one hour is preferred for roasting. The ambient atmosphere in the furnace in which the ore is roasted must be reducing, as before discussed, in order to avoid the detrimental effects of high gas flow rates on nickel recovery. The detrimental effects of high flow rates are compensated for by maintaining a flow of gas of proper composition through the furnace. The gas flow of proper composition which provides a sufficiently reducing atmosphere may be provided by a suitable mixture of $CO-CO_2$ or $H_2-H_2O$. If magnetic separation of the magnetic concentrate formed by the roast is to be employed, the preferred ratios of $CO/CO_2$ or $H_2/H_2O$ are 0.3–2.5 and 0.15–1.3, respectively, at 1800°F. The preferred ranges of the $CO/CO_2$ and $H_2/H_2O$ ratios vary with the roast temperature. For example, the preferred range for the $CO/CO_2$ ratio at 2000°F is 0.25–2.8 while the lower limit of the $H_2/H_2O$ ratio is 0.10 at 2000°F. It is noted that the lower ratios given above apply only if the nickel recovery or concentration is to be achieved by magnetic separation since if the $CO/CO_2$ or $H_2/H_2O$ ratio were lower than that given magnetic would probably be formed and report in the magnetic concentrate. The nickel content of the magnetic concentrate would then become unacceptably low. If, however, the calcine is to be leached in ammoniacal solutions, it is likely that still lower $CO/CO_2$ and $H_2/H_2O$ ratios may be effective. The upper preferred limits of the $CO/CO_2$ and $H_2/H_2O$ ratios are not firm since the upper limits of the ratios are only limited by the requirement that FeO must be stable in the reducing atmosphere provided by the gas mixtures. If the ratio of $CO/CO_2$ or $H_2/H_2O$ is too high, FeO is reduced by the reducing atmosphere to Fe and the resulting magnetic concentrate will contain an excessive amount of iron therein. It is noted that in order to maintain an appropriate ratio of $CO/CO_2$ or $H_2/H_2O$ to provide a sufficiently reducing atmosphere that it may be necessary to inject a higher gas ratio at the firing end of the furnace to insure sufficient CO or $H_2$ for reduction of the nickel oxides in the ore, and further that in any commercial application of the exemplary process that CO, $CO_2$, $H_2$ and $H_2O$ may all be present in the furnace atmosphere along with a large percentage of nitrogen from the air used for the combustion of fuel and minor quantities of argon, hydrocarbons, etc.

After the ore has been roasted to produce a calcine or sinter containing nickel alloyed with iron, the calcine is cooled in a suitable manner to avoid oxidation of the calcine, such as, through the use of tube coolers. The calcine is preferably then ground to separate the metallic alloy from the carbon to which it is attached and from gangue particles. A minus 100 mesh grind may be effectively used on calcine prepared from minus 48 mesh ore and coke. If a coarser ore and coke feed is used, grinding of the calcine to minus 65 or minus 48 mesh may be sufficient. Nickel or nickel alloy may then be recovered from the ground calcine by any conventional method, such as by magnetic separation preferably using a low intensity wet magnetic separator, froth flotation, tabling, heavy media separation, leaching, organic heavy liquid separation or other methods of ore dressing.

Thus, there has been provided an improved segregation roast process for recovering nickel from lateritic ores in which the composition of the gas atmosphere present over the ore during segregation roasting is maintained reducing. The reducing atmosphere is provided by suitable ratios of $CO/CO_2$ or $H_2/H_2O$ which may be caused to flow through the furnace in which the ore is roasted. Further, the exemplary process as here described provides a segregation roast process which may be set to provide optimum conditions for the treatment of each type of lateritic ore amenable to segregation roasting.

We claim:

1. In a roast segregation process for recovering nickel concentrate from lateritic ores wherein a carbonaceous reductant and a chloridizing agent are added to the ore to be treated and a reducing atmosphere is present over the ore, the improvement in combination therewith, comprising a method of maintaining the atmosphere conducive to reduction and for overcoming the adverse effect on the amount of nickel recovered due to the velocity of gas flowing over the ore during roasting said method comprising:

roasting the ore at a temperature in the range of 1600°F to 2000°F;

producing a flow of reducing atmosphere comprising a mixture of CO and $CO_2$ over the ore during roasting to produce a calcine containing nickel concentrate;

providing a reducing gas comprising CO and $CO_2$ having a ratio of CO to $CO_2$ at which FeO is stable;

controlling the composition of the atmosphere flowing over the ore by injecting into the atmosphere the reducing gas provided for maintaining the ratio of CO to $CO_2$ in the atmosphere at least at 0.25 and within the range at which FeO is stable, and treating the calcine nickel concentrate to recover a higher percentage nickel containing concentrate therefrom.

2. In a roast segregation process for recovering nickel concentrate from lateritic ores wherein a carbonaceous reductant and a chloridizing agent are added to the ore to be treated and a reducing atmosphere is present over the ore, the improvement in combination therewith comprising a method of maintaining the atmosphere conducive to reduction and for overcoming the adverse effect on the amount of nickel recovered due to the velocity of gas flowing over the ore during roasting said method comprising:

roasting the ore at a temperature in the range of 1600°F to 2000°F;

producing a flow of reducing atmosphere comprising a mixture of $H_2$ and $H_2O$ over the ore during roasting to produce a calcine containing nickel concentrate;

providing a reducing gas comprising $H_2$ and $H_2O$ having a ratio of $H_2$ and $H_2O$ at which FeO is stable;

controlling the composition of the atmosphere flowing over the ore by injecting into the atmosphere the reducing gas provided for maintaining the ratio of $H_2$ to $H_2O$ in the atmosphere at least at 0.10 and within the range at which FeO is stable; and treating the calcine nickel concentrate to recover a higher percentage nickel containing concentrate therefrom.

3. In a roast segregation process for recovering nickel concentrate from lateritic ores wherein a carbonaceous reductant and a chloridizing agent are added to the ore to be treated and a reducing atmosphere is present over the ore, the improvement in combination therewith comprising a method of maintaining the said atmosphere conducive to reduction and for overcoming the adverse effect on the amount of nickel recovered due to the velocity of gas flowing over the ore during roasting, said method comprising:

producing a flow of the reducing atmosphere over the ore during roasting;

providing a reducing gas;

roasting said ore at a temperature within the range of 1600°F to 2000°F; and controlling the composition of said atmosphere flowing over said ore by selecting said reducing gas from the group comprising a) a first mixture comprising CO and $CO_2$ wherein the ratio of CO to $CO_2$ in the roasting atmosphere is maintained at least at 0.25 and b) a second mixture comprising $H_2$ and $H_2O$ wherein the ratio of $H_2$ to $H_2O$ in the roasting atmosphere is maintained at least at 0.10.

4. The invention of claim 3 wherein the ratio of said selected mixture in the roasting atmosphere is maintained within a range in which FeO is stable.

5. The invention of claim 4 including continuing the roasting in the reducing atmosphere for a duration of from 0.5 to 2 hours.

* * * * *